United States Patent
Calves

(10) Patent No.: US 10,226,816 B2
(45) Date of Patent: Mar. 12, 2019

(54) METHOD AND ASSEMBLY FOR PRODUCTION OF A MECHANICAL COMPONENT BY SINTERING A PULVERULENT METALLIC MATERIAL

(71) Applicant: ETA SA MANUFACTURE HORLOGERE SUISSE, Grenchen (CH)

(72) Inventor: Paul Calves, Saint-Just-Saint-Rambert (FR)

(73) Assignee: ETA SA MANUFACTURE HORLOGERE SUISSE, Grenchen (CH)

( * ) Notice: Subject to any disclaimer, the term of this patent is extended or adjusted under 35 U.S.C. 154(b) by 571 days.

(21) Appl. No.: 14/898,012

(22) PCT Filed: Jun. 12, 2014

(86) PCT No.: PCT/FR2014/051433
§ 371 (c)(1),
(2) Date: Dec. 11, 2015

(87) PCT Pub. No.: WO2014/199090
PCT Pub. Date: Dec. 18, 2014

(65) Prior Publication Data
US 2016/0107230 A1    Apr. 21, 2016

(30) Foreign Application Priority Data
Jun. 12, 2013    (FR) ..................... 13 55447

(51) Int. Cl.
*B22F 3/00* (2006.01)
*B22F 3/03* (2006.01)
(Continued)

(52) U.S. Cl.
CPC .............. *B22F 3/03* (2013.01); *B22F 1/0003* (2013.01); *B22F 3/003* (2013.01); *B22F 3/14* (2013.01);
(Continued)

(58) Field of Classification Search
CPC .... B22F 3/03; B22F 3/003; B22F 3/14; B22F 3/16; B29C 43/006; B29C 43/52
(Continued)

(56) References Cited

U.S. PATENT DOCUMENTS

| 5,453,234 A | 9/1995 | Gusik |
| 6,012,392 A | 6/2000 | Norman et al. |

(Continued)

FOREIGN PATENT DOCUMENTS

| DE | 356716 | 7/1922 |
| EP | 0 601 397 A1 | 6/1994 |

(Continued)

OTHER PUBLICATIONS

International Search Report dated Mar. 18, 2015 in PCT/FR14/051433 Filed Jun. 12, 2014.

*Primary Examiner* — Mark A Chapman
(74) *Attorney, Agent, or Firm* — Oblon, McClelland, Maier & Neustadt, L.L.P.

(57) ABSTRACT

A method and an assembly for production of a mechanical component by sintering a pulverulent material, the method including: providing a pulverulent metallic material including grains, the pulverulent metallic material having a determined melting temperature; agglomerating a given quantity of the pulverulent metallic material under pressure inside a cavity; providing thermal energy to the given quantity of pulverulent metallic material to bring it to a given temperature below the melting temperature; and shocking the given quantity of agglomerated pulverulent metallic material and
(Continued)

brought to the given temperature to bind the grains of the pulverulent metallic material to each other to obtain one solid body. The one solid body is thus maintained under pressure and thermal energy accumulated in the solid body is made to dissipate to obtain the mechanical component.

13 Claims, 1 Drawing Sheet

(51) Int. Cl.
| | | |
|---|---|---|
| *B22F 3/14* | (2006.01) | |
| *B29C 43/00* | (2006.01) | |
| *B29C 43/52* | (2006.01) | |
| *B22F 1/00* | (2006.01) | |
| *B22F 3/16* | (2006.01) | |
| *B30B 15/34* | (2006.01) | |
| *B29C 43/16* | (2006.01) | |
| *B29C 51/42* | (2006.01) | |

(52) U.S. Cl.
CPC ............. *B22F 3/16* (2013.01); *B29C 43/006* (2013.01); *B29C 43/52* (2013.01); *B30B 15/34* (2013.01); *B22F 2003/031* (2013.01); *B29C 43/16* (2013.01); *B29C 51/428* (2013.01)

(58) Field of Classification Search
USPC .......................................................... 419/29
See application file for complete search history.

(56) References Cited

U.S. PATENT DOCUMENTS 6,123,895 A * 9/2000 Yamagata ............. C22C 29/065
257/E23.006
2007/0224075 A1 9/2007 Geiman et al.

FOREIGN PATENT DOCUMENTS

FR 2 924 192 A1 5/2009
JP 1-210144 A 8/1989

* cited by examiner

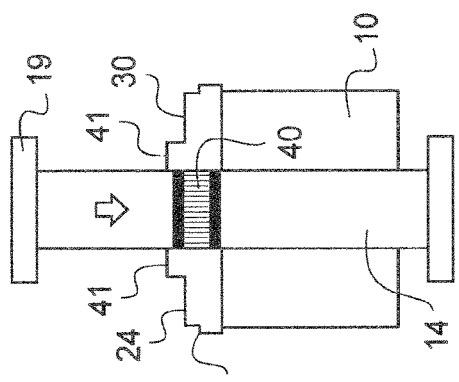
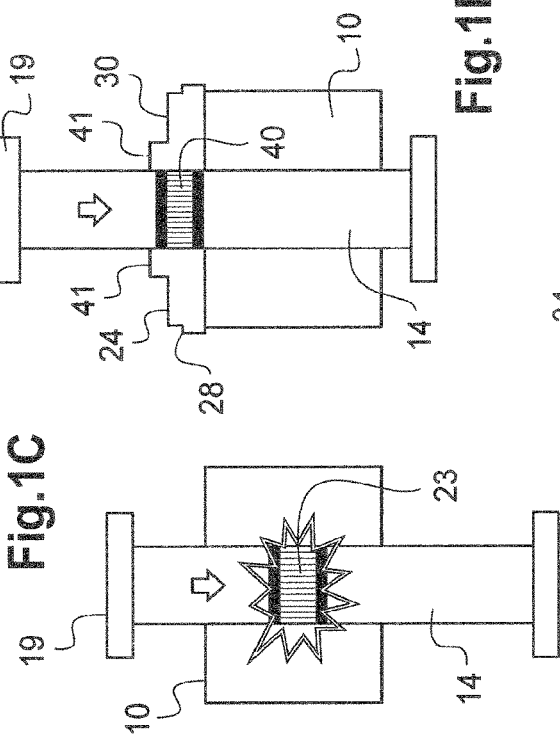
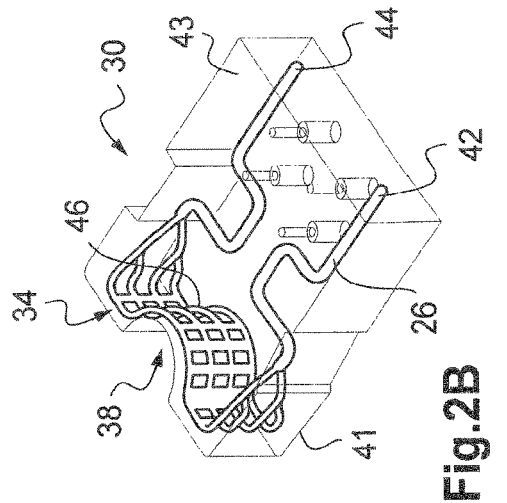
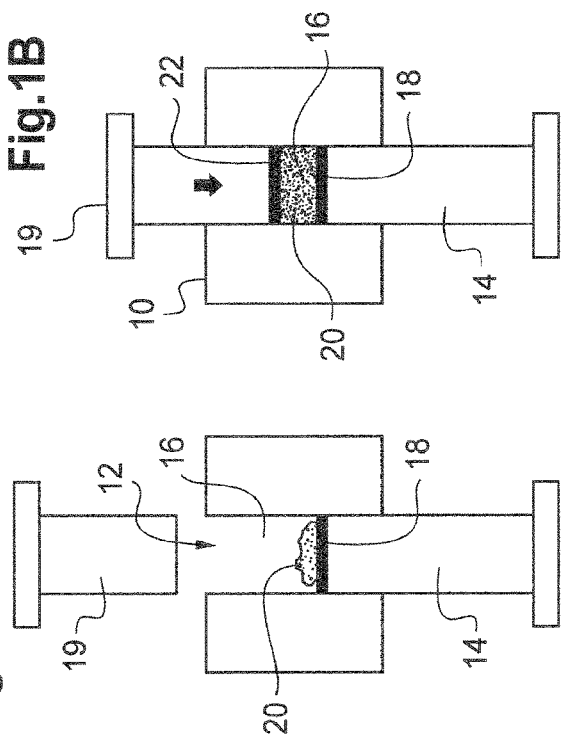
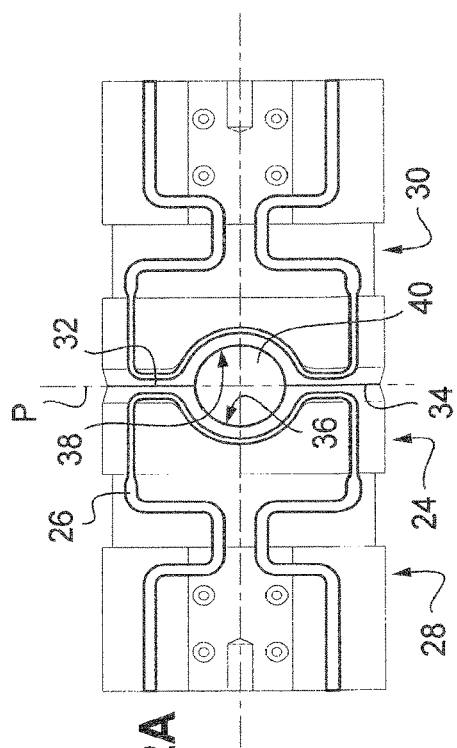

METHOD AND ASSEMBLY FOR PRODUCTION OF A MECHANICAL COMPONENT BY SINTERING A PULVERULENT METALLIC MATERIAL

CROSS-REFERENCE TO RELATED APPLICATIONS

This is a National phase application in the United States of International patent application PCT/FR2014/051433 filed Jun. 12, 2014 which claims priority on French patent application No. 1355447 filed Jun. 12, 2013. The entire disclosures of the above patent applications are hereby incorporated by reference.

The present invention relates to a method for production of a mechanical component by sintering a pulverulent metallic material and a production assembly for implementing such a method.

One field of application envisaged is that of mechanics in general for producing, for example, gears, pads or rings. Another intended field of application is that of biomedical applications, for example for making prosthetic elements.

"Sintering" refers here to the treatment wherein compressed powder grains in a metal mould are heated to a temperature lower than their melting point to bind them together to form one solid mass while maintaining the shape given by the mould.

Known powder metallurgy methods make it possible to create mechanical components by agglomerating and then sintering metallic or ceramic powders. To achieve this, in a first compaction step, there is used a die having a longitudinal through orifice, through one side of which there is engaged a lower punch, which thus delimits an open cavity, and through another side of which is engaged an upper punch adapted to close the cavity. The die is oriented such that the longitudinal orifice extends vertically. Thus, the cavity can then be filled with a powder, which is retained by the lower punch. The upper punch is then positioned through the longitudinal orifice in order to close the cavity and apply a force. The powder is then agglomerated and forcibly compressed between the two punches. One particular compaction method consists in the upper punch impacting with a given energy to produce the force required to form a green compact. A second distinct sintering step consists of a temperature treatment of the component to provide its mechanical properties.

However, the component thereby formed often deforms substantially after ejection from the die and shrinkage defects may also appear rendering the component unusable. Further, for precision mechanical components, the component thereby obtained must be machined in order to achieve the required dimensions.

Therefore, a problem that occurs and which the present intention intends to overcome, is to provide a method that makes it possible for mechanical components obtained by sintering a pulverulent material to maintain their dimensions after ejection from the die.

To this end, and according to a first object, the present invention proposes a method for production of a mechanical component by sintering a pulverulent material, said method being of the type including the following steps: there is taken a pulverulent metallic material comprising grains, said pulverulent metallic material having a determined melting temperature; a given quantity of said pulverulent metallic material is then agglomerated under pressure inside a cavity; then thermal energy is provided to said given quantity of pulverulent metallic material to bring it to a given temperature below said melting temperature; and said given quantity of agglomerated pulverulent metallic material is shocked and brought to said given temperature in order to bind or weld the grains of said pulverulent metallic material to each other in order to obtain one solid body. According to the invention, said one solid body is maintained under pressure and the thermal energy accumulated in said solid body is made to dissipate in order to obtain said mechanical component.

Thus, one feature of the invention lies in causing the cooling of the solid body while maintaining it under pressure. Consequently, the geometry and dimensions of the solid body are maintained owing to the pressure that is provided thereto throughout the entire cooling step. Further, the method according to the invention prevents the appearance of defects related to cooling, which makes it possible to envisage manufacturing solid components.

Preferably, the pulverulent metallic material provided is formed of grains of a pulverulent metallic material having a low melting point, for example at a temperature of less than 800° C. Copper-based alloys can therefore be implemented by the method according to the invention.

In a particularly advantageous implementation of the invention, said given quantity of said pulverulent metallic material is agglomerated under pressure inside a cavity of cylindrical symmetry. The cylindrical cavity makes it easy to drive a punch in translation therein, in order to compact and agglomerate the pulverulent metallic material.

Further, and according to a particularly advantageous variant, said one solid body is carried inside another cavity in order to dissipate said accumulated thermal energy. Transferring the solid body from a relatively hot cavity to a relatively cool cavity, makes it possible to bring down the temperature of the solid body more sharply and thus fix the dimensions of the latter. According to another variant embodiment, the thermal energy accumulated in the solid body is dissipated in said one cavity.

In order to simplify the transfer of the solid body, it is driven in translation from said cavity of cylindrical symmetry towards said other cavity which has the same cylindrical symmetry. As will be explained below, placing the two cavities of cylindrical symmetry one in the extension of the other, further simplifies the transfer.

Further, preferably, said given quantity of said pulverulent metallic material is agglomerated under pressure inside said one cavity between two opposite walls. Consequently, it is easier to provide a greater quantity of kinetic energy to the agglomerated metallic material powder and, together with the initial thermal energy, thereby cause the grains of metallic material to bind to each other.

According to another object, the present invention proposes an assembly for production of a mechanical component by sintering pulverulent metallic material comprising grains, said pulverulent metallic material having a determined melting temperature, said assembly including, on the one hand, a die having a cavity adapted to receive a given quantity of pulverulent metallic material, and on the other hand, a punch for agglomerating said given quantity of said pulverulent metallic material under pressure, said die including a heating device for supplying thermal energy to said given quantity of pulverulent metallic material and bringing it to a given temperature lower than said melting temperature, said assembly further comprising a device for striking said punch in order to shock or compact said given quantity of agglomerated pulverulent metallic material brought to said given temperature, in order to bind the grains of said pulverulent metallic material to each other to obtain one solid body. According to the invention, the assembly further includes a heat exchanger to cause the dissipation of accumulated thermal energy in said solid body, while said punch maintains said solid body under pressure so as to obtain said mechanical component.

Thus, by means of the heat exchanger, which is located around the solid body, the thermal energy that has accumulated therein, both during the heating phase and during impacts, is made to dissipate.

Further, the production assembly according to the invention also includes a counter-punch adapted to move coaxially facing said punch. Consequently, there are formed two opposite walls adapted to agglomerate and compress the pulverulent metallic material with improved mechanical efficiency.

Preferably, said one cavity has cylindrical symmetry. Consequently, the punch and the counter-punch can be driven therein in translation coaxially opposite each other. As a result, the solid body is maintained under pressure between the punch and the counter-punch, while it abuts radially against the die cavity wall, through the effect of the pressure. Thus, the solid body can be driven in translation axially inside the cavity.

According to a particularly advantageous feature of the invention, said heat exchanger defines another cavity having the same cylindrical symmetry, and said exchanger is adapted to be connected to said die such that said other cavity coincides with the extension of said one cavity. Further, the punch and the counter-punch are adapted to pass through said other cavity. Consequently, the coaxial translational motion of the punch and the counter-punch, between which the solid body is held, makes it possible to drive the solid body inside said other cavity. Thus, the solid body is driven from the hot die cavity towards the cold heat exchanger cavity. Therefore, the temperature of the solid body can be brought down sharply while it is maintained under pressure between the punch and the counter-punch inside said other cavity.

Advantageously, said heat exchanger has two half shells adapted to form said other cavity. The two half shells are positioned opposite each other and are movable transversally between a position away from each other and a position close to each other where they thus form said other cavity in the extension of said one die cavity.

Further, said heat exchanger preferably includes flow channels for a heat exchange fluid. These are arranged in the two half shells and particularly in proximity to the walls forming said other cavity. The arrangement of the flow channels through the heat exchanger will be explained in more detail in the description hereinafter.

Other characteristics and advantages of the invention will appear upon reading the following description of a specific embodiment of the invention, given simply by way of illustrative and non-limiting example, with reference to the annexed Figures, in which:

FIGS. 1A-1D are partial schematic views of an assembly production for a sintered mechanical component in the various phases of the implementation method;

FIG. 2A is a schematic top view of one element of the production assembly shown in FIG. 1D; and FIG. 2B is a schematic perspective view of an element shown in FIG. 2A.

The production method according to the invention and the production assembly for the implementation thereof are suitable for pulverulent metallic materials. Advantageously, they are suitable for pulverulent metallic materials having a melting temperature substantially lower than 800° C. Thus, metallic alloys with a low melting point can be implemented by such a method.

Reference will be made to FIGS. 1A to 1D to describe schematically and in detail the essential tooling elements and various steps of the compaction method according to the invention.

FIG. 1A is a schematic view of a die 10 having a cylindrical through orifice of circular symmetry 12. Die 10 is equipped with a heating device (not shown). According to a first variant, cartridge heaters operating by Joule effect are inserted through die 10. According to another variant, flow channels are provided for a hot heat transfer fluid through die 10 in order to heat it. According to yet another variant, induction heating means are implemented. Die 10 is equipped with a counter-punch 14 partially engaged in the lower portion of die 10 through cylindrical orifice 12 defining an open cavity 16 inside die 10. The upper end of counter-punch 14 is equipped with a lower sealing disc 18 forming a lower flat wall of cavity 16. Lower sealing disc 18 makes it possible to close the lower end of cylindrical orifice 12, and therefore cavity 16, in a sealed manner.

Further, FIG. 1A illustrates a punch 19 located opposite cavity 16 and remote from die 10. Punch 19 has an identical section to that of counter-punch 14 and is positioned coaxially. Further, counter-punch 14 and punch 19 are also brought to temperature by heating means (not shown). They may be heated by heating bands and/or by a system of moving shells comprising cartridge heaters; said moving shells surround the active end of the punches.

In a first phase of the method, the pulverulent metallic material 20, for example a copper alloy, is inserted inside cavity 16 on sealing disc 18. For example, 60 g of powder of said alloy is poured into cavity 16. Beforehand, the metal powder is brought, for example in an oven, to a temperature close to 700° C. Moreover, die 10 and the portions of punch 19 and of counter-punch 14 in contact with the metallic material are brought to temperature, by means of their heating and thermal regulation devices.

In a second phase of the method, illustrated in FIG. 1B, punch 19A is inserted into cavity 16, and in a first sequence, pulverulent metallic material 20 is pre-compacted in order to expel air. Thus, punch 19 has no sealing disc and the air therefore escapes between the wall of cavity 16 and punch 19 itself. The force exerted by punch 19 on pulverulent metallic material 20 is 5 tonnes here for a duration comprised, for example, between one and five seconds.

In a second sequence, punch 19 is removed from cavity 16 and equipped with an upper sealing disc 22 in order to pre-compact pulverulent material 20 again. Thus, cavity 16 containing pulverulent metallic material 20 is sealed. This second sequence has a duration of 30 seconds for example and the force exerted by punch 19 is around 10 tonnes. During this second sequence, the temperature of pulverulent metallic material 20 is homogenised and is brought to the working temperature set at 118° C.

In a third phase, illustrated in FIG. 1C, in which metal powder 20 is sintered, punch 19 is then subjected to impacts.

In the example shown here, the impact energy is on the order of 1680 J and there are 40 impacts. Consequently, the grains of metal powder 20 locally reach the melting point of the material which has the effect of forming one common phase between the grains. The appearance of the melt phase preferably occurs at the grain boundaries during the first impact and the proportion of this phase then increases gradually with the impacts. The assembly is thus consolidated during the cooling phrase illustrated in FIG. 1D. A solid one-piece body 23 is thereby obtained.

The latter Figure illustrates all the elements illustrated in the preceding Figures and also a heat exchanger 24 surmounting die 10.

Reference will first be made to FIGS. 2A and 2B, which show heat exchanger 24 in detail, before a more detailed description of FIG. 1D.

FIG. 2A illustrates a top view of heat exchanger 2 with flow channels for a heat exchange fluid 26 shown transparently. Heat exchanger 24 has two half-portions 28, 37 symmetrical to each other relative to an axial plane P. The half-portions 28, 30 respectively have front faces 32, 34, in which are arranged two recesses 36, 38 of cylindrical symmetry, forming 2 two half-shells. Thus, the two half-shells 36, 38 define a cooling cavity 40 of cylindrical symmetry of revolution.

FIG. 2B shows, in a three-quarter rear view, one of the two half-portions 30 of heat exchanger 24. The Figure also shows front face 34, located in a front portion 41, which is opposite a rear portion 43, and the half-shell formed by recess 38 arranged in front face 34.

The heat exchange fluid flow channels 26 are also clearly shown through the body of half-portion 30 of heat exchanger 24. The heat exchange fluid is, for example, cold water. The channels are therefore divided into two opposite branches 42, 44 which are joined at front portion 41 through a network 46 of pipes forming a cooling screen inside front portion 41 around recess 38. The other half-portion 28 has the same features in a symmetrical manner.

Thus, the cold fluid is injected into branch 42 and flows in front portion 41 through pipe network 46 forming the cooling screen around recess 38 which will be in direct contact with the component to be cooled. This network is defined to maximise the heat exchange surface closest to the component and therefore to evacuate the maximum number of calories. The fluid then exits through branch 44 opposite branch 42. This fluid could then advantageously be reintroduced after cooling at the circuit inlet through branch 42 to form a circuit.

Thus, when the two half-portions 28, 30 are press fitted, front face 32 against front face 34, they define together the cooling cavity 40 shown in FIG. 2A, which has an identical section to that of cavity 16 of die 10 illustrated in FIGS. 1A-1D.

FIG. 1D shows not only die 10 but also heat exchanger 24, formed of its two half-portions 28, 30. Only front portions 41, front face 36 against front face 38, are shown here. Thus, front portions 41 abut not only laterally one against the other, but also axially on the upper edges of die 10, so that cooling cavity 40 extends facing cylindrical orifice 42, in the extension of cavity 16 of die 10.

Consequently, starting from the position of solid body 23 shown in FIG. 1C, inside die 10 in cavity 16 and squeezed between the two punches 14, 19, solid body 23 is then driven into cooling cavity 40 of heat exchanger 24 by driving the two punches 14, 19 in translation together.

Thus, solid body 23 is driven from cavity 16 of die 10, into cooling cavity 40 of heat exchanger 24 while the pressure exerted by the two punches 14, 19 on solid body 23 remains. The pressure is for example brought to 15 tonnes for 120 seconds.

The production assembly which is described here with reference to the Figures and illustrates the method according to the invention may take another form and for example, comprise a die with a plurality of patterns or cavities respectively associated with a plurality of punches and counter-punches.

Other parameters, such as the pressure maintained on solid body 23 during cooling and the time that pressure is maintained, can also alter the mechanical features of the final material.

The invention claimed is:

1. A method for production of a mechanical component by sintering a pulverulent material, the method comprising:
    providing a pulverulent metallic material comprising grains, the pulverulent metallic material having a predetermined melting temperature;
    agglomerating a given quantity of the pulverulent metallic material under pressure inside a cavity;
    providing thermal energy to the given quantity of pulverulent metallic material to bring the material to a given temperature lower than the melting temperature;
    shocking, by a strike, the given quantity of agglomerated pulverulent metallic material brought to the given temperature to bind or weld the grains of the pulverulent metallic material to each other to obtain one solid body;
    wherein the one solid body is maintained under pressure and thermal energy accumulated in the solid body is made to dissipate to obtain the mechanical component.

2. The production method according to claim 1, wherein the pulverulent metallic material has a melting point below 800° C.

3. The production method according to claim 1, wherein the given quantity of the pulverulent metallic material is agglomerated under pressure inside a cavity of cylindrical symmetry.

4. The production method according to claim 1, wherein the one solid body is placed inside a second cavity to dissipate the accumulated thermal energy.

5. The production method according to claim 4, wherein the one solid body is driven in translation from the one cavity of cylindrical symmetry towards the second cavity with the same cylindrical symmetry.

6. The production method according to claim 4, wherein the second cavity has a cross section identical to the one cavity.

7. The production method according to claim 1, wherein the given quantity of the pulverulent metallic material is agglomerated under pressure inside the one cavity between opposite walls.

8. An assembly for production of a mechanical component by sintering pulverulent metallic material comprising grains, the pulverulent metallic material having a predetermined melting temperature, the assembly comprising:
    a die including a cavity configured to receive a given quantity of pulverulent metallic material; and
    a punch for agglomerating the given quantity of the pulverulent metallic material under pressure;
    the die including a heating device to supply thermal energy to the given quantity of pulverulent metallic material and to bring it to a given temperature lower than the melting temperature;
    the assembly further comprising:
    a device to shock by striking, via the punch, the given quantity of agglomerated pulverulent metallic material brought to the given temperature, to bind the grains of the pulverulent metallic material to each other to obtain one solid body; and a heat exchanger to cause dissipation of accumulated thermal energy in the solid body, while the punch maintains the solid body under pressure to obtain the mechanical component.

9. The production assembly according to claim 8, wherein the assembly further includes a counter-punch configured to move coaxially opposite the punch.

10. The production assembly according to claim 8, wherein the one cavity has cylindrical symmetry.

11. The production assembly according to claim 10, wherein the heat exchanger defines a second cavity having same cylindrical symmetry, and the heat exchanger is configured to move opposite the die such that the second cavity coincides with extension of the one cavity.

12. The production assembly according to claim 11, wherein the heat exchanger includes two half-shells configured to form the second cavity.

13. The production assembly according to claim 8, wherein the heat exchanger includes flow channels for a heat exchange fluid.

* * * * *